US012634414B2

(12) United States Patent (10) Patent No.: US 12,634,414 B2

Miller, Jr. et al. (45) Date of Patent: May 19, 2026

(54) ASSOCIATING AND CONFIGURING A NETWORK-ATTACHED CAMERA

(71) Applicant: TOSHIBA GLOBAL COMMERCE SOLUTIONS, INC., Durham, NC (US)

(72) Inventors: Melford L. Miller, Jr., Apex, NC (US); Timothy W. Crockett, Raleigh, NC (US); Scott M. Graham, Oxford, NC (US)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 0 days.

(21) Appl. No.: 18/755,270

(22) Filed: Jun. 26, 2024

(65) Prior Publication Data

US 2026/0006157 A1 Jan. 1, 2026

(51) Int. Cl.
| | |
|---|---|
| *H04N 7/18* | (2006.01) |
| *G06K 7/14* | (2006.01) |
| *G06Q 20/20* | (2012.01) |

(52) U.S. Cl.
CPC ............. *H04N 7/18* (2013.01); *G06K 7/1413* (2013.01); *G06Q 20/20* (2013.01)

(58) Field of Classification Search
CPC ......... H04N 7/18; G06K 7/1413; G06Q 20/20
USPC .......................................................... 348/143
See application file for complete search history.

(56) References Cited

U.S. PATENT DOCUMENTS

| | | | | |
|---|---|---|---|---|
| 6,847,393 | B2 * | 1/2005 | Ashe ........................ | G07G 3/00 |
| | | | | 348/143 |
| 9,269,083 | B1 * | 2/2016 | Jarajapu ............. | G06Q 20/3223 |

| | | | | |
|---|---|---|---|---|
| 10,438,470 | B2 * | 10/2019 | Wulff ................. | G06K 7/10336 |
| 10,839,181 | B1 * | 11/2020 | Fjellstad ................ | G07G 3/003 |
| 11,475,429 | B2 * | 10/2022 | Sweitzer .............. | G06Q 20/204 |
| 11,501,275 | B2 * | 11/2022 | Steiner ............... | G06K 7/10792 |
| 11,868,842 | B2 * | 1/2024 | Conticello ........... | G06K 7/1404 |
| 12,014,544 | B2 * | 6/2024 | Brakob .................. | G06V 20/52 |
| 2003/0098910 | A1 * | 5/2003 | Kim ....................... | G06Q 30/06 |
| | | | | 348/E7.086 |
| 2011/0134256 | A1 | 6/2011 | Moribe et al. | |
| 2013/0169801 | A1 | 7/2013 | Martin et al. | |
| 2014/0222545 | A1 * | 8/2014 | Hajji ...................... | G06Q 20/20 |
| | | | | 705/16 |

(Continued)

FOREIGN PATENT DOCUMENTS

EP            2387227 A2    11/2011

OTHER PUBLICATIONS

Amaryllo, How to setup your camera via QR code, pp. # 1-4, Feb. 19, 2020, https://www.youtube.com/watch?v=QeFMrp5pVMQ.

(Continued)

*Primary Examiner* — John W Miller
*Assistant Examiner* — Omer Khalid
(74) *Attorney, Agent, or Firm* — Patterson + Sheridan, LLP; Gero G. McClellan

(57) ABSTRACT

Embodiments of the present disclosure provide techniques for associating a camera with a POS system, and providing a user access to a stream of the camera's feed. The present disclosure provides an improvement to technology associated with cameras at POS systems. The improved technology includes using barcodes to communicate with a CMS via a camera's stream. Such communication enables improvement in efficiency and accuracy when assigning cameras to POS systems, and when configuring or performing diagnostics on the camera.

12 Claims, 4 Drawing Sheets

(56) References Cited

U.S. PATENT DOCUMENTS

| | | |
|---|---|---|
| 2021/0344875 A1 | 11/2021 | Dubois et al. |
| 2023/0283750 A1 | 9/2023 | Paul |

OTHER PUBLICATIONS 123 cctv, How to use your QR Code to connect your DVR/NVR, pp. 1-2, May 23, 2017, https://www.youtube.com/watch?app=desktop &v=1Qe5X0pFweg.

Hangzhou Hikvision Digital Technology Co., Ltd, Add a Device by Scanning Device QR Code. © 2019, https://www.hik-connect.com/views/terms/newHelp/helplos/GUID-E7B07E11-9A53-42CF-96AA-DE69FAC22D66.html.

International Search Report and Written Opinion received for PCT Patent Application No. PCT/US2024/057369, mailed on Jan. 28, 2025, 18 pages.

* cited by examiner

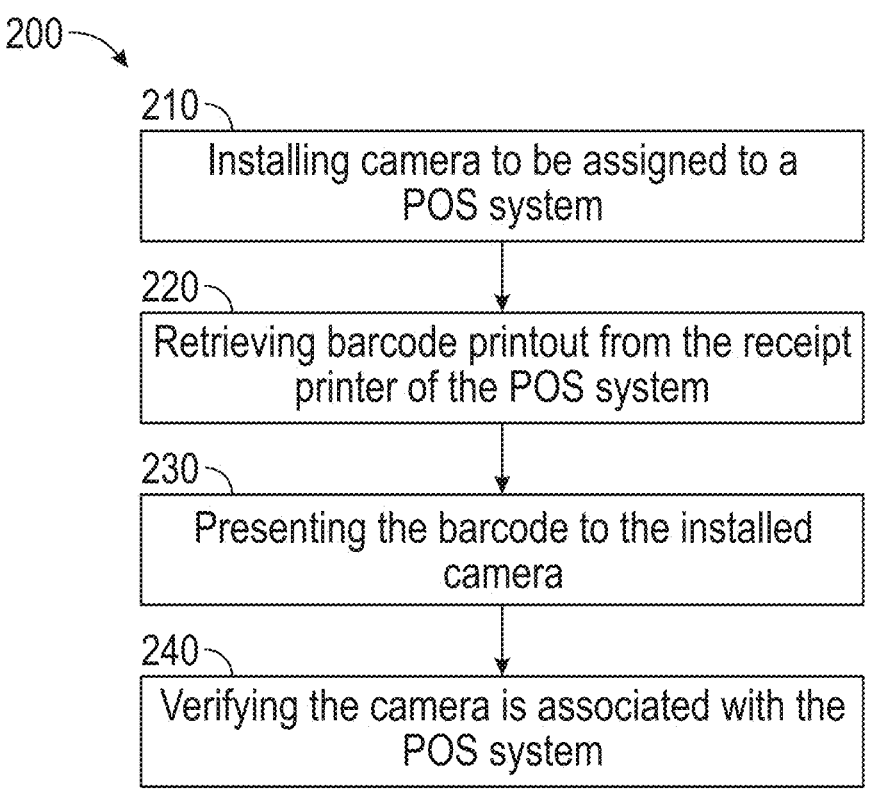

200

210   Installing camera to be assigned to a POS system

220   Retrieving barcode printout from the receipt printer of the POS system

230   Presenting the barcode to the installed camera

240   Verifying the camera is associated with the POS system

FIG. 2

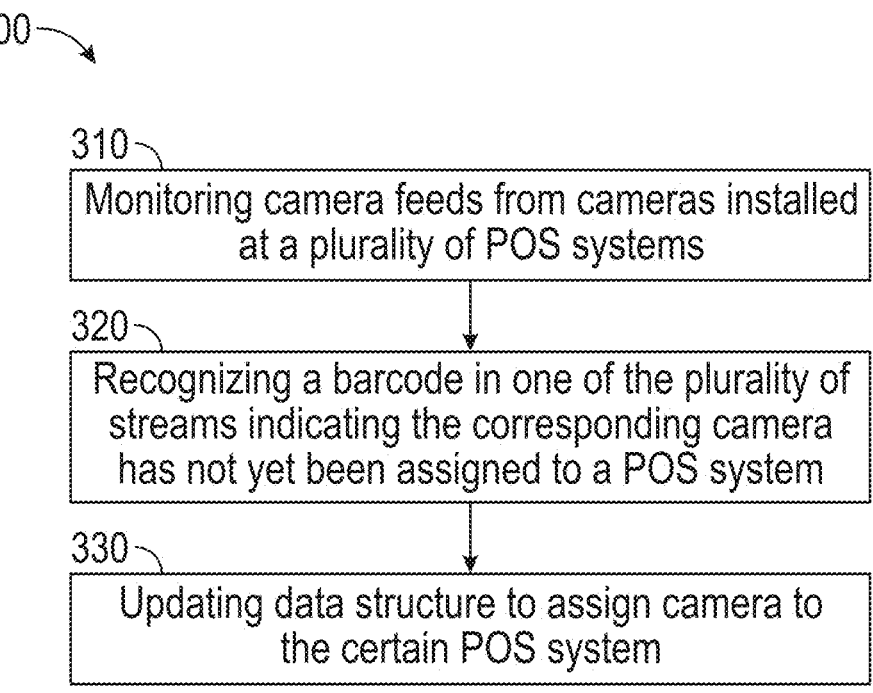

300

310   Monitoring camera feeds from cameras installed at a plurality of POS systems 320   Recognizing a barcode in one of the plurality of streams indicating the corresponding camera has not yet been assigned to a POS system 330   Updating data structure to assign camera to the certain POS system

FIG. 3

ASSOCIATING AND CONFIGURING A NETWORK-ATTACHED CAMERA

BACKGROUND

The present disclosure relates to cameras at point of sale (POS) systems. POS systems enable customers to make purchases, process transactions, manage sales and inventory, etc. POS systems can include cameras to enhance overall security by providing visual surveillance of transactions and the surrounding environment. A central monitoring system (CMS) for POS cameras consolidates footage from the multiple cameras at a centralized location. The CMS may store information regarding the camera(s) associated with a particular POS system, the camera feeds for each camera, etc.

Cameras installed for a POS system can be power over Ethernet (POE) attached with no local connection with the camera. In instances where the camera has a maintenance issue, it may be beneficial to have access to the camera's field of view. However, because the camera is POE attached, the person who may benefit from viewing the camera's field of view to make adjustments cannot access the camera's field of view using the POS system.

BRIEF DESCRIPTION OF THE DRAWINGS

FIG. 2 depicts a flow diagram illustrating a technician's point of view to associate a camera with a POS system, according to one embodiment.

FIG. 3 depicts a flow diagram illustrating the steps taken by a CMS to associate a camera with a POS system, according to one embodiment.

DETAILED DESCRIPTION

Embodiments of the present disclosure provide techniques for associating a camera with a POS system, and providing a user access to a stream of the camera's feed. For example, to record an installed camera as being associated with a POS system, the camera's serial number and the POS system's serial number can be manually provided to the CMS but this is a slow and error prone process. Additionally, providing a user access to a stream of the camera's feed is also an extensive process that provides only a snapshot of the camera's field of view. For example, a person doing maintenance work on the camera can call a central control station for the CMS that receives the camera feed, have the central control station manually find the camera that shows the person it its field of view, and have that image sent to them. This is inefficient and taxing for the person providing maintenance.

Advantages of Using a Barcode to Associate Camera's and POS Systems, and Using a Barcode to Provide a User Access to a Camera's Field of View Current technical solutions fail to provide efficient techniques for associating a camera with a POS system, and for providing a user access to the field of view of a camera at a POS system. This failure leads to errors in records of a CMS, and inefficiency when providing maintenance to cameras. The present disclosure provides for an improvement to a specific technology associated with cameras at POS systems. The improved technology includes using barcodes to communicate with a CMS via a camera's stream. Such communication enables improvement in efficiency and accuracy when assigning cameras to POS systems, and when providing maintenance to cameras. For instance, the present disclosure provides for the CMS to recognize a barcode, which may be a 1-D or 2-D barcode, within a camera's feed. In recognizing the barcode in a camera's feed, the CMS can perform automated tasks (such as assigning a camera with a POS system, or providing a user access to a stream of the camera feed), depending on the 1-D or 2-D barcode recognized.

In one embodiment, a user uses a generated 1-D or 2-D barcode (which will be referred to as a "barcode," herein) to associate a camera with a POS system. Another embodiment uses a barcode to provide a user a stream of camera's feed. These cameras may be near or physically connected to a POS system, but POE attached to a network device, with no means to directly communicate with the POS system. Data from the cameras is stored in a CMS, where it is processed and used for security, item recognition, ensuring compliance with regulations, etc.

Figure 1:
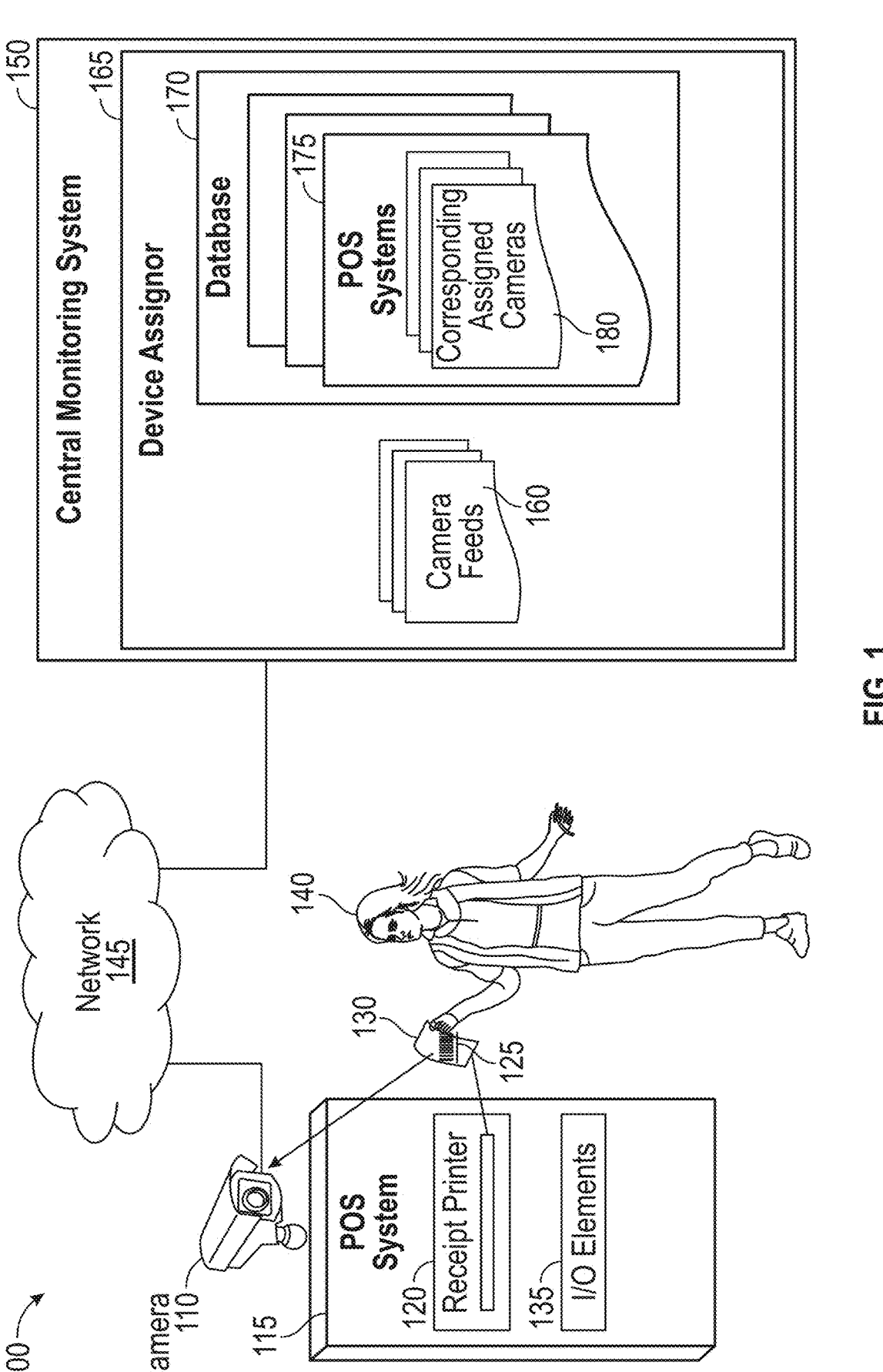
FIG. 1 depicts a first example environment, according to one embodiment.

With reference now to FIG. 1, a first example environment 100 is depicted. The POS system 115 includes a receipt printer 120, and I/O elements 135 that allow a user 140 to interact with the POS system 115. The camera 110 is installed with the intent of being associated with the POS system 115. From the receipt printer 120, a receipt 130 is printed with the barcode 125.

In this embodiment, the barcode 125 is used to assign the camera 110 to the POS system 115. The barcode 125 on the receipt paper 130 is shown to the camera 110 by the user 140 (who may be a technician or someone who installed the camera 110). The camera 110 may be near or physically connected to a POS system 115, but POE attached, with no local communication connection to interact with the camera 110 using the POS system 115. Rather, the camera's 110 association with the POS system 115 is recorded in a CMS 150. In one embodiment, the CMS 150 serves as a nexus between the camera 110 and the POS system 115.

The POS system 115 and the camera 110, are connected to the CMS 150 over the network 145. Within the CMS 150 is a device assignor 165. The device assignor 165 (e.g., a software application) assigns cameras such as camera 110, to POS systems such as POS system 115. The device assignor 165 uses a database 170 to do this. The database 170 stores data regarding a plurality of POS systems 175 that the CMS 150 monitors, and the corresponding assigned cameras 180 of the plurality of POS systems 175. The database 170 may then be updated with the new assignment.

In the current embodiment, the POS system 115 may be a POS system inside a store. This includes but is not limited to a self-checkout lane or kiosk where a customer initiates and completes transactions with minimal assistance from a staff member using a scanner. This may involve a touch screen kiosk, where I/O elements 135 include touch screen capabilities, or responsive buttons. Another non-limiting example of a POS system is a terminal where products may be scanned with a scanner or browsed and selected, and payments may be made and processed. This terminal may involve a traditional cashier driven POS system where transactions are initiated and completed by a staff member who operates the POS system.

In the current embodiment, the camera 110 may not yet be associated with the POS system 115. This refers to an instance where the camera 110 may be installed and operational, but not yet recorded as being assigned to the POS system 115 within the CMS 150. For example, the camera 110 may be connected to a network device (e.g., a router) which provides the camera 110 with a connection to the network 145, but the camera 110 is not communicatively coupled to the POS system 115. Without this integration or linkage to the POS system 115, the camera's 110 footage is not yet synchronized with transaction data or other data collected from the camera's 110 feed inside the CMS 150.

To make this association and assign the camera 110 to the POS system 115, a user 140 (who may be a technician or someone who installed or is providing maintenance to the camera 110) presents a barcode 125 to the camera 110. In one embodiment, the barcode 125 can be printed from the receipt printer 120 of the POS system 115 that the camera 110 is to be assigned to.

The camera 110 is integrated with the CMS 150 before it is assigned to the POS system 115. To integrate the camera 110 with the CMS 150, the camera 110 may be connected to the network 145. This connection may be a POE connection such that there is no electrical method for the camera to communicate with the POS system 115. The CMS 150 is also connected to the network 145. The CMS 150 can be programmed to recognize and communicate with the cameras on the network 145, such as the camera 110. The connection of the camera 110 to the CMS 150 over the network 145 is what facilitates assigning the camera 110 to the POS 115.

The CMS 150 has a database 170 in which it stores data about a plurality of POS systems 175, and data about their corresponding assigned cameras 180. The database 170 in the CMS 150 stores and organizes information about each camera and POS system, and their integration within the CMS 150. Relevant information can include but is not limited to the serial numbers of each, the location where they are in use, configuration settings, network connectivity information, etc. The CMS 150 can also track the mapping between POS systems 175 and their corresponding assigned cameras 180. A camera can be assigned to one or more POS systems based on factors such as the camera's location, the camera's coverage area, etc. For example, a camera positioned with three POS systems in view can be mapped to all three POS systems, two of the three POS systems, or just one of the three POS systems. It is also possible to have a plurality of cameras mapped to just one POS system. The reasoning behind camera mapping choices can depend on the size of the establishment or POS system (such that more cameras allocated to one POS system may be beneficial to capture different angles), the budget of the establishment, the security needs of the establishment, etc. Data stored in the database 170 regarding POS systems 175 and their corresponding assigned cameras 180 can involve synchronized transaction data of the POS system with video footage from the camera. It may be that when a transaction occurs at a POS terminal, the CMS correlates the transaction data with the corresponding camera feeding ensuring the transaction aligns with the video recording. Additionally, mapping POS systems 175 to cameras can allow for implementation of rules and triggers based on transaction events. Some non-limiting examples include generating alerts or flags for high value transactions, or detecting suspicious activity at POS systems from their corresponding camera's feed.

In the current embodiment, when the camera 110 is installed, after establishing connection to the network 145 it begins communicating with the CMS 150 over that network 145. As the camera 110 communicates with the CMS 150 via the network 145 its feed can be monitored by the CMS 150. That is, the CMS 150 establishes communication with the camera 110 over the network 145, enabling the CMS 150 to receive the camera's 110 feed. The feed from the camera 110 can be displayed within the CMS interface, along with other cameras connected over the network 145 to the CMS 150. The CMS may be generate alerts and notifications based on predefined events or triggers detected by the cameras. This can include but is not limited events such as motion detection, tampering, or other suspicious activities.

In the current embodiment, when the camera 110 is installed at the POS system 115, the POS system's 115 receipt printer 120 prints a barcode 125 on its receipt paper 130. This may be done automatically in response to the POS 115 recognizing that a camera has been installed near it, or by instruction from a user 140 instructing the POS system 115 to print such a barcode using the POS system's 115 I/O elements 135.

A user 140, who may be a technician, or a maintenance worker, among other things, can then place the barcode 125 printed on the receipt paper 130 in the camera's 110 field of view. The camera's 110 feed may already be monitored within the CMS 150 alongside the other camera feeds 160 that the CMS 150 monitors. Using the device assignor 165 to assign the camera 110 to the POS system 115, the CMS 150 may recognize the barcode 125 from the camera's 110 field of view. The device assignor 165 can detect that the barcode from the camera 110 was recognized amongst the camera feeds 160 that it monitors, and then update the database 170 such that the POS system 115 is associated with the camera 110. The update can include the POS system 115 being recorded within the plurality of POS systems 175 as having the camera 110 as at least one of its corresponding assigned cameras 180.

Updating the database 170 in response to the device assignor 165 assigning the camera 110 to the POS system 115 can be done in multiple steps. The POS system 115 can detect the presence of new cameras in its vicinity. This can be done using identification capabilities such as but not limited to programming the POS system to scan for nearby cameras or identifiers of cameras in response to certain triggers. This can enable the receipt printer 120 to generate a barcode 125. The barcode 125 can print in response to the POS system 115 recognizing a camera having been installed in its vicinity, or it can be manually prompted to print though a user 140 interaction with the I/O elements 135 of the POS system 115. The barcode 125 can act as an identifier of the POS system 115 (e.g., the barcode 125 can contain an ID of the POS system 115) such that the device assignor 165 recognizes that it is to assign the camera 110 with the feed it recognizes the barcode in to the POS system 115 identified in the barcode. When the data assignor 165 of the CMS 150 recognizes or decordes the barcode 125 in one of the camera feeds 160 the CMS 150 is can monitor over the network 145, it can update the database 170 with the camera's 110 information and association with the POS system 115. This update can ensure the CMS 150 reflects the current configuration of cameras and their relationships with POS systems 175. Part of updating the database 170 of the CMS 150 with the camera 110 being assigned to the POS system 115 can include synchronizing the camera 110 data to the POS system 115 data that is monitored by the CMS 150. For example, the CMS 150 may be updated to synchronize transaction data from the POS system 115 with surveillance footage from the camera 110 at the time of the transaction, among other things.

In some embodiments, the barcode 125 may be presented from a medium other than the receipt paper 130 from the receipt printer 120 of the POS system 115. Examples include but are not limited to a mobile application, a pre-printed paper, etc. For example, the technician may have a mobile application on a user device (e.g., smartphone or tablet) that can display the barcode 125 with the ID of the POS system which the technician can then hold in front of the camera 110.

With reference now to FIG. 2, flow diagram 200 is depicted describing the user's 140 process of associating the camera 110 with the POS system 115.

At block 210, the user 140 installs the camera 110. The camera 110 can be installed at the POS system 115, near the POS system 115 or away from the POS system 115.

When installing the camera 110, the user 140 may consider various factors. For example, before installation, the user 140 (who may be a technician, maintenance person, etc.) can conduct a survey of the site to determine the location for camera placement. This determination may be made based on business security requirement, coverage desires, among other things. Additional factors can include the layout of the premises (which can be a store), particular areas of vulnerability, lighting conditions, and regulatory requirements, among other things.

Another aspect of installing the camera 110 can be the mounting and hardware installation process. For example, once the location for a camera is determined, the camera 110 can be mounted and installed using appropriate techniques. Such techniques may change depending on location. Additionally, hardware components such as cables, power supplies, connection to the network 145, etc. can also be considered. The camera 110 can be connected to a network device through POE.

At block 220, in this embodiment, the user 140 retrieves the barcode 125 from the receipt printer 120 of the POS system 115. As mentioned above, the barcode 125 may be presented from a medium other than the receipt paper 130 from the receipt printer 120 of the POS system 115. Examples include but are not limited to a mobile application, a pre-printed paper, etc.

Barcodes represent a method of encoding data in a visual, machine readable format. The barcode can be of different dimensions. For example, 2-D barcodes can consist of patterns of squares, dots, or other geometric shapes arranged in a recognizable fashion. In terms of data capacity, 2-D barcodes can store more data than 1-D barcodes, including alpha-numeric characters, binary data or document data. It is also possible for 2-D barcodes to incorporate error correction techniques that enable them to still be read even if damaged. 3-D barcodes consist of multiple layers of information stacked, creating a 3-dimentional structure. In terms of data capacity, 3-D barcodes may be able to store more data than a 2-D barcode, which is achieved by stacking a plurality of layers of information rather than storing data within a 2-dimentional grid.

The barcode 125 retrieved by the user 140 can be printed automatically as the POS system 115 recognizes a camera is installed, or can be manually initiated by the user 140 via the I/O elements 135. The barcode 125 can represent the POS system 115. For example, it may contain identification information for the POS system such as a serial number, location, etc.

At block 230, the user 140 presents the barcode to the installed camera 110. The CMS 150 monitors camera views by receiving and processing video feeds from the cameras connected to the network 145. As discussed above, the camera 110 connects to the network 145 as part of the installation process. The feed of the camera 110 is transmitted to the CMS 150 over the network 145. The CMS 150 can recognize the camera 110 via the network 145 connection. The camera's 110 feed is received and monitored by the CMS 150. This is depicted as the camera feeds 160. As part of monitoring the camera feeds 160, the CMS 150 may also recognize different items within the camera feeds 160. For example, the CMS 150 may detect objects or items within the camera feeds 160. This may be enabled by training machine learning models on labeled datasets to identify target objects based on visual characteristics, amongst other things.

Part of this is also barcode scanning capabilities. This refers to the CMS 150 being capable of recognizing barcodes in the camera feeds 160. When recognizing the barcode 125 in the camera feed of the camera 110, the CMS 150 can scan and decode the barcode within the camera feed of camera 110. The barcode 125 may contain identification information for the POS system 115, enabling the CMS 150 to update its database 170 to record the camera 110 having an association with the POS system 115. This can be done via the device assignor 165.

At block 240, the user 140 can verify that the camera 110 has been associated with the POS system 115 after it presents the barcode 125 so that it is in the camera feed of the camera 110. The verification could be though checking the CMS's 150 configuration settings to confirm that the camera 110 is correctly associated with the POS system 115 within the database 170 of the CMS 150. This may involve checking mapping configurations, the corresponding assigned cameras 180 to the POS systems 175, and other things of this nature.

Additionally, tests can be conducted to verify that transaction data of the POS system 115 is synchronized with video footage, transaction logs can be reviewed to verify that CMS 150 data is correctly correlated to the camera footage, and other abnormalities and discrepancies can be checked for to ensure the camera 110 is assigned to the POS system 115. In one embodiment, when the camera is registered with the POS system 115, the CMS 150 notifies the POS system 115 which can then display a message for the technician to see indicating the camera has been registered.

With reference now to FIG. 3, flow diagram 300 depicts the CMS's 150 process for updating its database to assign the camera 110 to the POS system 115.

At block 310, the CMS 150 monitors camera feeds 160 from a plurality of cameras installed at a plurality of POS systems. As mentioned above, the feed of the camera 110 is transmitted to the CMS 150 over the network 145. The CMS 150 monitors the plurality of camera feeds 160 by receiving, processing and displaying the streams from each connected camera to the network 145. Upon establishing network connectivity and having the camera 110 registered within the CMS 150 database 170, the feed from the camera 110 (and the other cameras connected to the CMS 150 via network 145 connection) can be transmitted over the network 145 and processed by the CMS 150. Monitoring may be live monitoring or monitoring done by reviewing stored or recorded footage. The CMS 150 may generate alerts and notifications based on predefined events detected in the cameras' feeds 160. As part of this, the CMS 150 may also recognize different items within the camera feeds 160. For example, the CMS 150 may be configured to detect objects or items within the camera feeds 160. This may be enabled by training machine learning models on labeled datasets to identify target objects based on visual characteristics, amongst other things.

At block 320, the CMS 150 recognizes the barcode 125 in the camera's 110 stream. As mentioned above, the CMS 150 may have recognition capabilities, where items viewed and processed in the camera streams 160 can trigger an action or alert within the CMS 150. This includes but is not limited to barcode scanning capabilities. The barcode 125 may contain identification information for the POS system 115, enabling the device assignor 165 to update its database 170 to record the camera 110 having an association with the POS system 115.

At block 330, the CMS 150 updates the data structure within its database 170 to assign the camera 110 to the POS system 115. As mentioned above, updating the database 170 occurs in response to the device assignor 165 assigning the camera 110 to the POS system 115, and can be done in multiple ways. When the camera 110 is associated with the POS system 115 after the barcode 125 is processed by the CMS 150, the CMS 150 can update its database 170 such that the camera 110 is associated with the POS system 115 within its stored data of a plurality of POS systems 175 and their associated cameras 180. This can mean that mapping is between the camera 110 and the POS system 115, there is documentation of the assignment between camera 110 and POS system 115, among other things.

Figure 4:
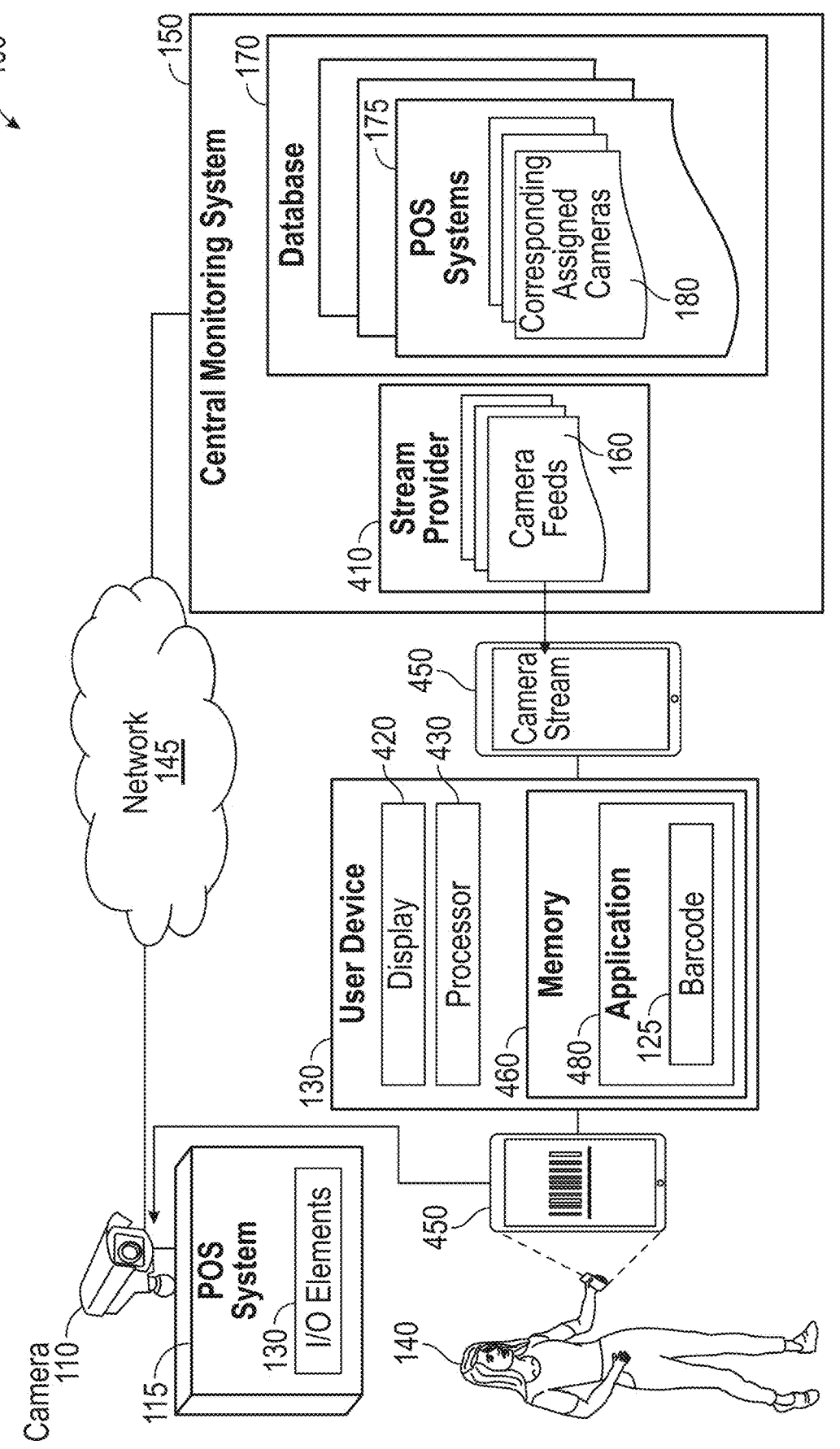
FIG. 4 depicts a second example environment, according to one embodiment.

With reference now to FIG. 4, a second example environment 400 is depicted. In environment 400, similar to environment 100, there is the POS system 115 that includes I/O elements 135 that allow a user 140 to interact with the POS system 115. The camera 110 is installed and associated with the POS system 115.

If the user 140 (who may be a maintenance worker, a technician, or someone generally working with the camera) wants to have a visual of the camera's 110 feed, in this example, the user 140 uses an application 480 to receive access to the stream.

The application 480 can be found within a user device 450. Examples of a user device 450 can include but are not limited to mobile computing devices such as cell phones, laptop computers, tablets, etc. The user device 450 has a display 420, a processor 430, and memory 460 where the application 480 is accessible data is stored. The application 480 provides the barcode 125. In this embodiment, the barcode 125 can contain information identifying where the stream of the camera's 110 feed should be received, and an indication to the CMS 150 to prompt the camera 110 to go into a diagnostic mode such that it can be adjusted by the user 140, as the user sees fit. Prompting the camera 110 to enter a diagnostic mode may allow the user 140 to safely and securely adjust or provide maintenance to the camera 110. A diagnostic mode can enable access to tools such as logging features, status indicators, changed configuration options, etc. that may not be in use during regular operation.

Similar to the example environment 100, in the current embodiment, the camera 110 may be connected by a network 145 to the CMS 150. Within the CMS 150 is the database 170 that contains information regarding the plurality of POS systems 175 and their corresponding assigned cameras 180 monitored by the CMS 150. Also within the CMS 150 is a stream provider 410 containing the camera feeds 160 of the cameras the CMS 150 is assigned to monitor. One of the camera feeds 160 is the camera feed of the camera 110. As mentioned above, the database 170 in the CMS 150 stores and organizes information about each camera and POS system, and their integration within the CMS 150. Relevant information can include but is not limited to the serial numbers of each, the location where they are in use, configuration settings, network connectivity information, etc. The CMS 150 can also track the mapping between POS systems 175 and their corresponding assigned cameras 180. A camera can be assigned to one or more POS systems based on factors such as the camera's location, the camera's coverage area, etc.

In the current embodiment, the user 140, who may be a technician, or a maintenance worker, among other things, can then place the barcode 125 from the mobile application 480 in the camera's 110 field of view. The camera's 110 feed should already be monitored within the CMS 150 alongside the other camera feeds 160 that the CMS 150 monitors. This barcode 125, in the current embodiment, may signal the CMS 150 to provide the camera feed of the camera 110 to the mobile application 480, depicted in 450. The barcode 125 can also instruct the CMS 150 to initiate a diagnostic mode for the camera 110.

The diagnostic mode for camera 110 may offer specialized functionality and capabilities designed to assist the user 145 in identifying and resolving uses related to the camera's 110 operation, functionality, etc.

As mentioned above, the CMS 150 can be configured with barcode scanning capabilities through the camera feeds 160. The data encoded in the barcode 125, can trigger the CMS 150 to perform actions. In this embodiment, the barcode 125 can contain identification information of the application 480, data prompting the CMS 150 to provide a camera stream of the camera feed from the camera that the barcode is recognized in, such as camera 110, and a destination(s) for where or how the feed should be provided. The final destination of the camera feed can be at the user device 450. Examples of how the user device 450 receives the feed from the stream provider 410 of the CMS can include but is not limited to, the form of a link to a stream of the camera feed. The link can show a stream of the feed (a live stream or recording of the feed) viewable from the display 420 of the mobile device.

The stream provider 410 can establish communication with the destination for the stream of the camera feed that the barcode 125 was recognized in. For example, the CMS 150 can deliver a link to stream the camera feed. For example, CMS 150 may send a text message to the user device 450 that includes the link. When the user clicks or presses the link (e.g., a URL hyperlink), a web browser is opened that displays the camera feed. Alternatively, the CMS 150 can deliver the camera feed of the camera 110 directly to the user device 450. The application 480 may automatically receive and display the camera feed.

Streams of the camera feeds 160 can be delivered through a combination of factors. Such factors may include but are not limited to encoding or compressing the video of the camera feed, transmitting the camera feed over a network such as network 145 to reach the targeted destination, etc.

Figure 5:
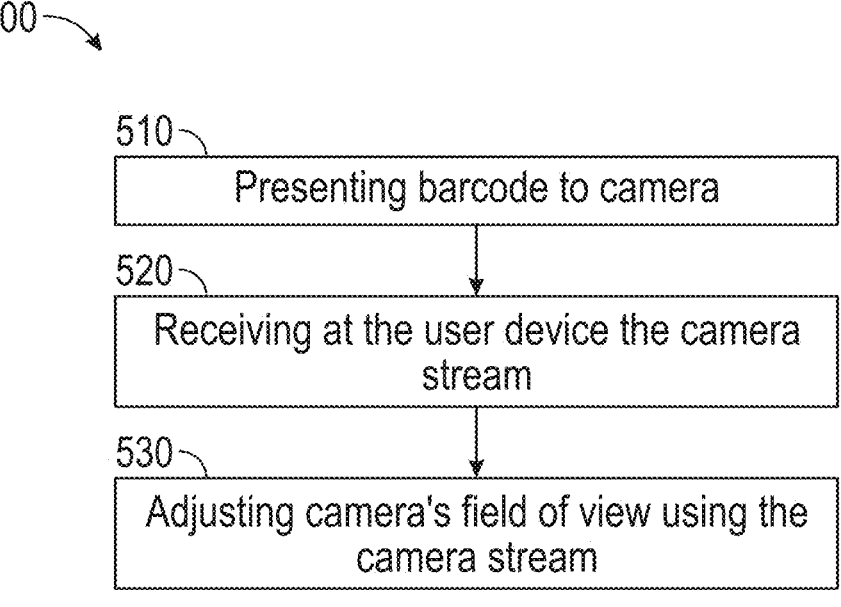
FIG. 5 depicts a flow diagram illustrating a technician's point of view to adjust a camera's field of view, according to one embodiment.

With reference now to FIG. 5, the flow diagram 500 is depicted. At block 501, the user 140 presents the barcode 125 to the camera 110. The user 140 can display the barcode 125 such that is in the field of view of the camera. The barcode 125 can be shown from a mobile application, a pre-printed paper, etc. For example, the technician may have a mobile application on a user device (e.g., smartphone or tablet) that can display the barcode 125 with the ID of the POS system which the technician can then hold in front of the camera 110.

Part of this is also barcode scanning capabilities. This refers to the CMS 150 being capable of recognizing barcodes in the camera feeds 160. When recognizing the barcode 125 in the camera feed of the camera 110, the CMS 150 can scan and decode the barcode within the camera feed of camera 110. The barcode 125 may contain instructions for the CMS 150 to prepare to send the camera's 110 feed to a destination, identification information of the final destination of where the stream of the camera feed is to be sent, etc.

At block 520, the user 140 receives the camera stream of the camera 110. This can be done via the stream provider 410, and the stream of the camera feed can be received directly at the user device 450 in some embodiments or through a link to the stream of the video feed. In an embodiment where the camera feed of camera 110 is accessed via a link sent by the stream provider 410, the CMS 150 may generate a uniform resource locator (URL) link that directs the user 140 to the location of the streaming content. The URL serves as an address through which the user 140 can access the stream of the camera's 110 feed. The user 140 accessing the URL may send a request to the CMS's 150 stream provider 410, prompting it to transmit the streaming content of the camera's 110 feed to the destination where the user 140 can view it.

At block 530, now that the user 140 has access to the stream of the camera's 110 feed and field of view, the user 140 adjusts the camera as they may see fit. As discussed, the camera's 110 field of view helps synchronize information from the camera 110 with the POS system 115 for reasons such as security. Providing the stream of the camera's 110 feed is beneficial for improving synchronization capabilities, security, etc. The user 140 with access to the feed of the camera 110 can pan and tilt the camera 110, move it closer or further away from an area, etc. depending on the desired result while being able to use the stream of the camera feed for guidance.

Figure 6:
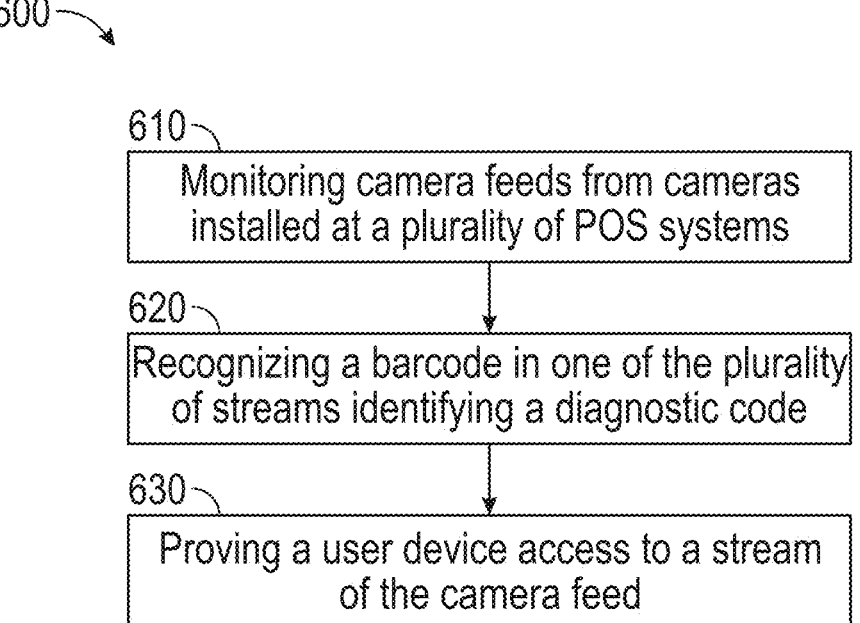
FIG. 6 depicts a flow diagram illustrating the steps taken by a CMS to provide a technician access to a camera feed, according to one embodiment.

FIG. 6 illustrates a flow diagram 600 for actions performed by the CMS. At block 610, the CMS monitors the camera feeds 180 installed at a plurality of POS systems 175. As discussed above, the feed of the camera 110 is transmitted to the CMS 150 over the network 145. The CMS 150 monitors the plurality of camera feeds 160 by receiving, processing and displaying the streams from each connected camera to the network 145.

At block 620, the CMS recognizes the barcode 125 in one of the plurality of feeds 160, identifying that the barcode in this embodiment represents a diagnostic code. As mentioned above, the CMS 150 recognizes the barcode 125 in the camera's 110 stream. The barcode 125 may contain instructions for the CMS 150 to provide a stream of the camera 110 to a location specified in the barcode 125, ultimately providing the user device 450 access to the camera's 110 feed.

At block 630, the CMS 150 provides the user device 140 access to a stream of the camera's 110 feed. As discussed above, the stream provider 410 can establish communication with the destination for the stream of the camera feed that the barcode 125 was recognized in. For example, the CMS 150 can deliver a link to stream the camera feed where the barcode 125 was recognized, or the CMS 150 can deliver the camera feed of the camera 110 directly to the user device 450, ultimately providing the user device 450 access to the camera's 110 feed.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to the described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not an advantage is achieved by a given embodiment is not limiting of the scope of the present disclosure. Thus, the following aspects, features, embodiments and advantages are merely illustrative and are not considered elements or limitations of the appended claims except where explicitly recited in a claim (s). Likewise, reference to "the disclosure" shall not be construed as a generalization of any inventive subject matter disclosed herein and shall not be considered to be an element or limitation of the appended claims except where explicitly recited in a claim(s).

Aspects of the described embodiments may take the form of an entirely hardware embodiment, an entirely software embodiment (including firmware, resident software, microcode, etc.) or an embodiment combining software and hardware aspects that may generally be referred to herein as a "circuit," "module" or "system."

One or more of the described embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the described embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the described embodiments.

Aspects of the described embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a described manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged for the computing resources actually used (e.g. an amount of storage space consumed by a user or a number of virtualized systems instantiated by the user). A user can access any of the resources that reside in the cloud at any time, and from anywhere across the Internet. In context of the described embodiments, a user may access applications (e.g., the CMS) or related data available in the cloud. For example, the CMS could execute on a computing system in the cloud and assign a camera to a POS system, or provide a stream of a camera feed to a user device. In such a case, the CMS could assign a camera to a POS system, or provide a stream of a camera feed to a user device] and store instructions for doing so at a storage location in the cloud. Doing so allows a user to access this information from any computing system attached to a network connected to the cloud (e.g., the Internet).

While the foregoing is directed to one or more embodiments, other and further embodiments may be devised without departing from the basic scope thereof, and the scope thereof is determined by the claims that follow.

13

What is claimed is:

1. A method comprising:

monitoring a camera feed of a camera that has not yet been assigned to a point of sale (POS) system;

recognizing in the camera feed, an image of a barcode identifying the POS system and a predefined transaction event occurring at a location identified in the camera feed;

assigning the camera to the POS system;

generating a network connectivity map between the camera and the POS system; and executing, using the network connectivity map, a transaction trigger event at the POS based on the identified predefined transaction event occurring at the location in the camera feed.

2. The method of claim 1, wherein assigning the camera comprises updating a database in a central monitoring system (CMS) to assign the camera to the POS system, wherein the CMS monitors a plurality of POS systems.

3. The method of claim 2, wherein the database contains a record of the plurality of POS systems and a plurality of cameras that are assigned to at least one of the plurality of POS systems.

4. The method of claim 1, wherein the camera uses a power over Ethernet (POE) connection to a network device, wherein the camera is not directly connected to the POS system.

5. The method of claim 1, wherein barcode is printed from a receipt printer of the POS system that the camera is to be assigned to.

6. The method of claim 1, wherein the barcode is displayed on a mobile device at the POS system.

7. The method of claim 1, wherein the barcode encodes an identify (ID) of the POS system.

8. The method of claim 1, wherein the barcode encodes instructions to assign the camera to the POS system.

9. The method of claim 1, wherein the camera is installed at a POS system.

10. The method of claim 1, wherein the camera is installed at a location separate from the POS system.

11. A system comprising:

a scanner;

a camera;

a printer;

a memory; and a processor coupled to the memory and configured to perform operations comprising:

monitoring a camera feed of the camera that has not yet been assigned to a point of sale (POS) system;

recognizing in the camera feed, an image of a barcode printed by the printer and encoded with an ID identifying the POS system and a predefined transaction event occurring at a location identified in the camera feed;

assigning the camera to the POS system;

generating a network connectivity map between the camera and the POS system;

executing, using the network connectivity map, a transaction trigger event at the POS based on the identified predefined transaction event occurring at the location in the camera feed.

12. The system of claim 11, where the camera is connected to a network device using a POE connection.

* * * * *